United States Patent

Murakami et al.

[11] Patent Number: 5,467,328
[45] Date of Patent: Nov. 14, 1995

[54] LENS DRIVE MECHANISM FOR OPTICAL DISC PLAYER WITH PARALLEL SUPPORT SPRINGS HAVING DIFFERENT SPRING CONSTANTS

[75] Inventors: Yutaka Murakami; Toru Nakamura; Takao Hayashi, all of Katano; Akira Matsubara, Kameoka; Hisashi Aizawa, Nara, all of Japan

[73] Assignee: Matsushita Electric Industrial Co., Ltd., Osaka, Japan

[21] Appl. No.: 285,513

[22] Filed: Aug. 4, 1994

[30] Foreign Application Priority Data

Aug. 4, 1993 [JP] Japan .................... 5-193429

[51] Int. Cl.⁶ .................................... G11B 7/09
[52] U.S. Cl. .................. 369/44.16; 359/814; 359/824
[58] Field of Search .................. 359/813–814, 359/823–824; 369/44.14–44.16, 44.32, 112

[56] References Cited

U.S. PATENT DOCUMENTS 5,126,983  6/1992  Ikegame et al. .............. 369/44.14 X

FOREIGN PATENT DOCUMENTS 58-182140  10/1983  Japan .
62-36739   2/1987   Japan .

Primary Examiner—W. R. Young
Attorney, Agent, or Firm—Wenderoth, Lind & Ponack

[57] ABSTRACT

A lens drive mechanism for an optical disc player includes a movable unit including an objective lens for focusing a coherent beam of light on an optical disc, a lens holder carrying the objective lens, focusing and tracking coils secured to opposite portions of a periphery of the lens holder. The lens drive mechanism also includes permanent magnets and yokes, and a plurality of support members connected at one end to the periphery of the lens holder and at the opposite end to a support fixture for supporting the movable unit for movement in focusing and tracking directions substantially perpendicular to each other. A upper set of the support members has a spring constant different from that of a lower set of the support members, and the product of the spring constant of the upper set of the support members multiplied by a distance from the center of gravity of the movable unit to a position of securement of the upper set of the support members is chosen to be equal to the product of the spring constant of the lower set of the support members multiplied by a distance from the center of gravity of the movable unit to a position of securement of the lower set of the support members.

20 Claims, 5 Drawing Sheets

LENS DRIVE MECHANISM FOR OPTICAL DISC PLAYER WITH PARALLEL SUPPORT SPRINGS HAVING DIFFERENT SPRING CONSTANTS

BACKGROUND OF THE INVENTION

1. Field of the Invention

The present invention relates to a lens drive mechanism in an optical disc player such as, for example, a compact disc (CD) player or a laser disc (LD) player or any other player of a type utilizing a beam of light to scan an information carrier medium.

2. Description of the Prior Art

It is well known that commercially available optical disc players make use of a lens drive mechanism or lens actuator for driving an object lens in two directions substantially perpendicular to each other, i.e., a focusing direction and a tracking direction. The focusing direction is a direction in which the objective lens is driven parallel to the optical axis of the objective lens so that a laser beam emitted from an optical system can be focused on an optical disc to form thereon a beam spot of 1 μm in size while the tracking direction is a direction substantially perpendicular to the optical axis of the objective lens and in which the objective lens is moved laterally of the optical axis so as to compensate for change in position of the beam spot relative to a particular information bearing track in the form of a train of pits and lands defined on the optical disc, which change would occur as a result of a wobbling or eccentric motion of the optical disc. Control of the objective lens in these two directions is important in accomplishing a faithful recording or reproduction of information on or from the optical disc then rotating in one direction.

A typical prior art lens drive mechanism of the kind referred to above comprises a stationary unit including a support base having upright yokes perpendicular to the base, and permanent magnets fixedly carried by the base so as to confront the associated permanent magnets to thereby form respective magnetic circuits therebetween. The lens drive mechanism also comprises a movable unit including a generally tubular lens holder having an objective lens mounted thereon and carrying both a focusing coil externally around the lens holder and generally flat tracking coils cemented to respective portions of the focusing coil that are opposite to each other with respect to the optical axis. The movable unit is supported by the support base by means of upper and lower pairs of elongated spring elements for movement in the tracking direction and also in the focusing direction.

This prior art lens drive mechanism is so designed that, when the focusing and tracking coils are electrically energized as a result of flow of an electric current therethrough, electromagnetic forces are developed between the coils and the magnetic circuits to drive the movable unit, specifically the lens holder, in two directions substantially perpendicular to each other as is well known to those skilled in the art.

In this type of an lens drive mechanism requiring such a two-directional drive, it has been recognized that any unnecessary torsional resonance such as a rolling motion of the objective lens must be eliminated. For this purpose, the use has been suggested of a counterweight secured to a bottom portion of the lens holder to adjust the center of gravity of the lens holder in an attempt to eliminate any possible torsional resonance such as disclosed in, for example, the Japanese Laid-open Patent Publication No. 58-182140.

However, the use of the counterweight makes it difficult to render the lens drive mechanism, particularly the lens holder, to have a reduced axial dimension. The use of the counterweight also results in an increase of the weight of the lens holder, which in turn results in an increased of the electric power consumed by the lens drive mechanism.

SUMMARY OF THE INVENTION

The present invention has accordingly been devised to substantially eliminate the problems inherent in the prior art lens drive mechanisms and is intended to provide an improved lens drive mechanism compact in size and requiring a minimized amount of electric power.

To this end, the present invention provides a lens drive mechanism which comprises a movable unit including an objective lens for focusing a coherent beam of light on at least an information carrier medium, a lens holder carrying the objective lens, focusing and tracking coil elements secured to or wound around a periphery of the lens holder. The lens drive mechanism also comprises a magnetic circuit including a permanent magnet element and a U-shaped yoke means and sandwiching the focusing and tracking coil elements, and a plurality of support members sandwiching the focusing coil element and connected at one end to a periphery of the lens holder and at the opposite end to a support fixture for supporting the movable unit for movement in focusing and tracking directions substantially perpendicular to each other, wherein a center of fitting of an upper set of the support members adjacent the objective lens and a lower set of the support members adjacent the yoke means with respect to a direction parallel to an optical axis of the objective lens is different from the center of gravity of the movable unit.

The upper set of the support members has a spring constant different from that of the lower set of the support members. Also, the product of the spring constant of the upper set of the support members multiplied by a distance from the center of gravity of the movable unit to a position of securement of the upper set of the support members is equal to the product of the spring constant of the lower set of the support members multiplied by a distance from the center of gravity of the movable unit to a position of securement of the lower set of the support members.

Preferably, a center of fitting of the tracking coil element with respect to a direction parallel to the optical axis of the objective lens is moved to a position different from the position of securement of the support members with respect to the direction parallel to the optical axis to thereby bring a center of a tracking drive force generated in the tracking coil element into alignment with the center of gravity of the movable unit.

According to the present invention, with no need to use any counterweight hitherto required in the prior art lens drive mechanism, the center of gravity of the movable unit can be aligned with a support center, making it possible to eliminate an unnecessary torsional resonance. Accordingly, the movable unit can be made compact in size, having a light weight feature, to such an extent that the lens drive mechanism as a whole can be made compact in size, requiring a reduced amount of electric power.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Figure 1:
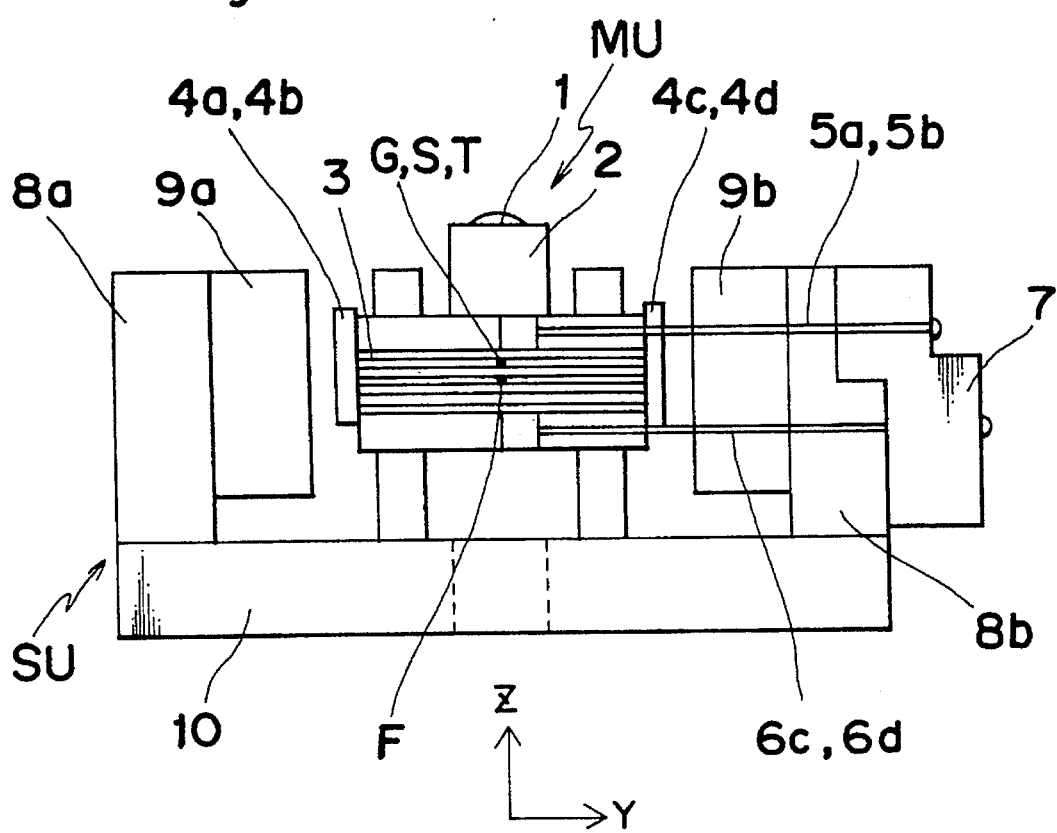
FIG. 1 is a schematic side view of a lens drive mechanism according to a first preferred embodiment of the present invention.

FIGS. 1 to 5 pertains to a first preferred embodiment of the present invention. A lens drive mechanism particularly shown in FIG. 1 comprises a stationary unit and a movable unit generally identified by SU and MU, respectively. The stationary unit SU includes a generally rectangular support base 10 having a center hole defined therein and also having upright yokes 8a and 8b formed integrally with, or connected rigidly to, opposite ends of the support base 10 so as to extend perpendicular to the base 10. Permanent magnets 9a and 9b are fixedly secured to the respective upright yokes 8a and 8b so as to confront with each other. The support base 10 also includes bearing poles connected rigidly to, or formed integrally with, the support base 10 and positioned between the upright yokes 8a and 8b so as to extend perpendicular to the support base.

The movable unit MU includes a lens holder 2. This lens holder 2 is comprised of a generally tubular lens mount carrying an objective lens 1 and a generally square-sectioned bobbin having a through-hole defined therein in alignment with the optical axis of the objective lens 1. The square-sectioned bobbin has first to fourth side faces and also has bearing holes defined therein on respective sides of the through-hole so as to extend completely through the thickness thereof. While the movable unit MU is mounted on the stationary unit SU with the bearing poles on the base plate 10 loosely extending through the associated bearing holes in the square-sectioned bobbin, the lens holder 2 is yieldably supported by the support base 10 by means of upper and lower pairs of electroconductive wire springs 5a, 5b and 6c, 6d connected fixedly at one end with the bobbin and at the opposite end with a support fixture 7 that is secured to the upright yoke 8b on one side opposite to the adjacent permanent magnet 9b.

It will thus be readily understood that the lens holder 2 so supported in the manner described above is displaceable a predetermined distance in a direction (i.e., the focusing direction identified by Z) along the optical axis of the objective lens 1 and also in a direction (i.e., the tracking direction identified by X in FIG. 9) generally perpendicular to both of the optical axis of the objective lens 1 and any one of the wire springs 5a, 5b, 6c and 6d.

A focusing coil 3 is formed externally around the bobbin of the lens holder 2 in concentric relation with the optical axis of the objective lens 1, having its opposite ends connected electrically with, for example, the wire springs 5a and 5b of the upper pair for receiving the supply of an electric current from a source thereof through the wire springs 5a and 5b. As is the case with the prior art lens drive mechanism, the focusing coil 3 when electrically energized cooperates with magnetic circuits, created respectively by the permanent magnets 9a and 9b, to drive the lens holder 2 in either one of the opposite directions along the optical axis of the objective lens 1 depending on the direction of flow of the electric current through the focusing coil 3. The distance over which the lens holder 2 is moved in either direction depends on the value of the supplied electric current, to thereby accomplish a focusing of the objective lens 1.

Pairs of flat tracking coils 4a, 4b and 4c, 4d are cemented externally to respective portions of the focusing coil 3 which are opposite to each other and confront the associated permanent magnets 9a and 9b. The flat tracking coils 4a and 4b or 4c and 4d of each pair are spaced a slight distance from each other, but are electrically connected in series with each other. On the other hand, the pairs of the tracking coils 4a, 4b and 4c, 4d are connected in parallel to each other and opposite common junctions of a parallel circuit formed by the pairs of the tracking coils 4a, 4b and 4c, 4d are in turn connected electrically with the wire springs 6c and 6d of the lower pair for receiving the supply of an electric current from a source thereof through the wire springs 6c and 6d.

As is the case with the prior art lens drive mechanism, the tracking coils of the two pairs when electrically energized cooperate with the magnetic circuits, created respectively by the permanent magnets 9a and 9b, to drive the lens holder 2 in either one of the opposite directions perpendicular to the optical axis of the objective lens 1 depending on the direction of flow of the electric current through the paired tracking coils 4a and 4b, 4c and 4d. The distance over which the lens holder 2 is laterally moved in either direction depends on the value of the supplied electric current, to thereby accomplish a tracking of the objective lens 1.

Figure 3:
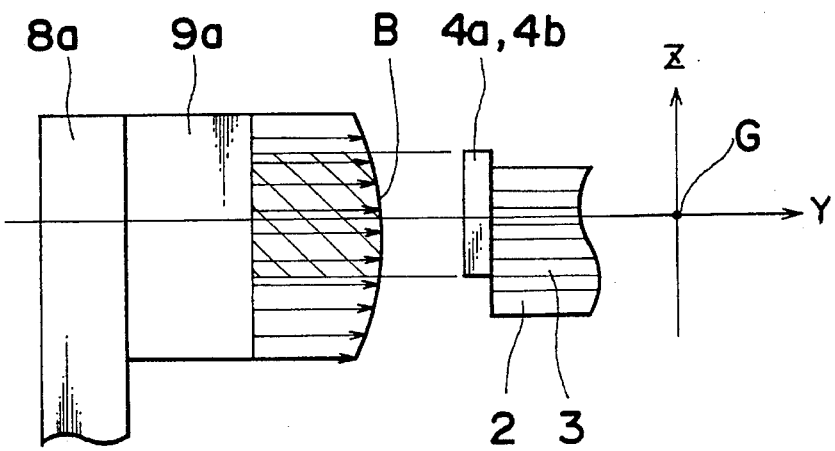
FIG. 3 is a fragmentary side view, on an enlarged scale, of a portion of the lens holder, showing a pattern of distribution of magnetic fluxed.

The paired tracking coils 4a and 4b, 4c and 4d are so mounted on the movable unit MU and so cemented to those portions of the focusing coil 3 around the bobbin of the lens holder 2 that a tracking drive center T associated with each pair of the tracking coils may be aligned with the center of gravity G of the movable unit MU including the lens holder 2, the focusing coil 3 and the paired tracking coils 4a and 4b, 4c and 4d. Referring particularly to FIG. 3, the tracking drive center T referred to above can be fixed by determining the position of an integrated center B of a portion of magnetic fluxes emanating from the associated permanent magnet 9a across the associated pair of the tracking coils 4a and 4b or 4c and 4d, with respect to the focusing direction Z. Thus, it will readily be seen that each pair of the tracking coils 4a and 4b or 4c and 4d are fitted to the movable unit MU so that the magnetic flux integrated center B with respect to the focusing direction is held level with the center of gravity G of the movable unit MU.

Figure 2:
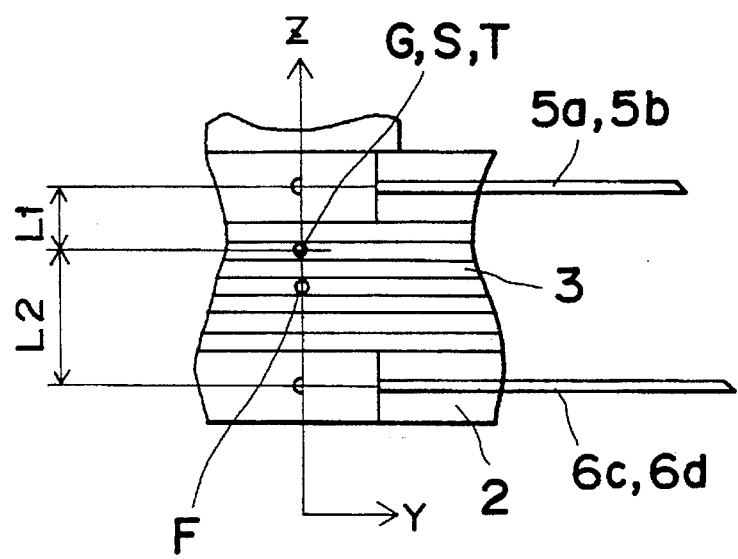
FIG. 2 is a schematic side view of a portion of a lens holder used in the lens drive mechanism of FIG. 1.

The wire springs 5a and 5b of the upper pair and the wire springs 6c and 6d of the lower pair have respective effective lengths different from each other. More specifically, the wire springs 5a, 5b, 6c and 6d have their respective effective lengths so chosen as to satisfy the following relationship to adjust the spring constant of each of the wire springs 5a, 5b, 6c and 6d and a support center S thereof is aligned with the center of gravity G of the movable unit MU:

$$Ka \times L1 = Kb \times L1 = Kc \times L2 = Kd \times L2$$

wherein Ka and Kb represent respective spring constants of the wire springs 5a and 5b of the upper pair; Kc and Kd represent respective spring constants of the wire springs 6c and 6d of the lower pair; L1 is shown in FIG. 2 and represents the distance from the center of gravity G of the movable unit to the upper pair of the wire springs 5a and 5b as measured in the focusing direction Z; and L2 is shown in FIG. 2 and represents the distance from the center of gravity G of the movable unit to the lower pair of the wire springs 6c and 6d as measured in the focusing direction Z.

The lens drive mechanism according to the foregoing embodiment of the present invention operates in the following manner. As discussed above, the lens holder 2 is supported by means of the paired wire springs 5a and 5b, 6c and 6d with the center of gravity G of the movable unit MU aligned with the support center S. Therefore, when the focusing coil 3 is electrically energized, the focusing coil 3 cooperates with the magnetic circuits to generate focusing drive forces symmetrical with respect to the optical axis of the objective lens 1. Therefore, the lens holder 2 is driven in the focusing direction Z while a focusing drive center F assumes a position on the axis passing across and aligned with the center of gravity G of the movable unit MU in the focusing direction Z, allowing a laser beam passing through the objective lens 1 to be accurately focused on an optical disc.

On the other hand, when the paired tracking coils 4a and 4b, 4c and 4d are electrically energized, the paired tracking coils 4a and 4b, 4c and 4d cooperate with the respective magnetic circuits to generate tracking drive forces on respective sides of the lens holder 2 with the respective tracking drive centers T aligned with the center of gravity G of the movable unit MU as discussed with reference to FIG. 3, allowing the lens holder 2 to be laterally moved stably in the tracking direction X. Consequently, the laser beam passing through the objective lens 1 is held in position to faithfully trace the information bearing track on the optical disc.

According to the first preferred embodiment of the present invention as described above, a center of fitting of the pairs of the tracking coils 4a and 4b, 4c and 4d to the lens holder 2 with respect to the focusing direction Z is substantially aligned with the position of the center of gravity G of the movable unit MU with respect to the focusing direction Z to align the tracking drive center T with the center of gravity G. Also, the upper and lower pairs of the wire springs 5a and 5b, 6c and 6d have their different effective lengths to adjust the spring constants so that the support center S can align with the center of gravity. Therefore, with no need to employ the counterweight such as required in the prior art lens drive mechanism, an unnecessary torsional resonance resulting from a twist can be suppressed, making it possible to manufacture a compact and lightweight lens holder 2.

It is to be noted that displacement of the support center S relative to the center of gravity G of the movable unit MU in the focusing direction Z results in an increase of the amount of torsion about an axis Y at a primary resonant frequency which is a primary peculiar value of a support member of the lens drive mechanism while displacement of the tracking drive center T relative to the center of gravity G of the movable unit MU in the focusing direction Z results in an increase of the amount of torsion about the axis Y at a frequency higher than the primary resonant frequency.

Figure 4:
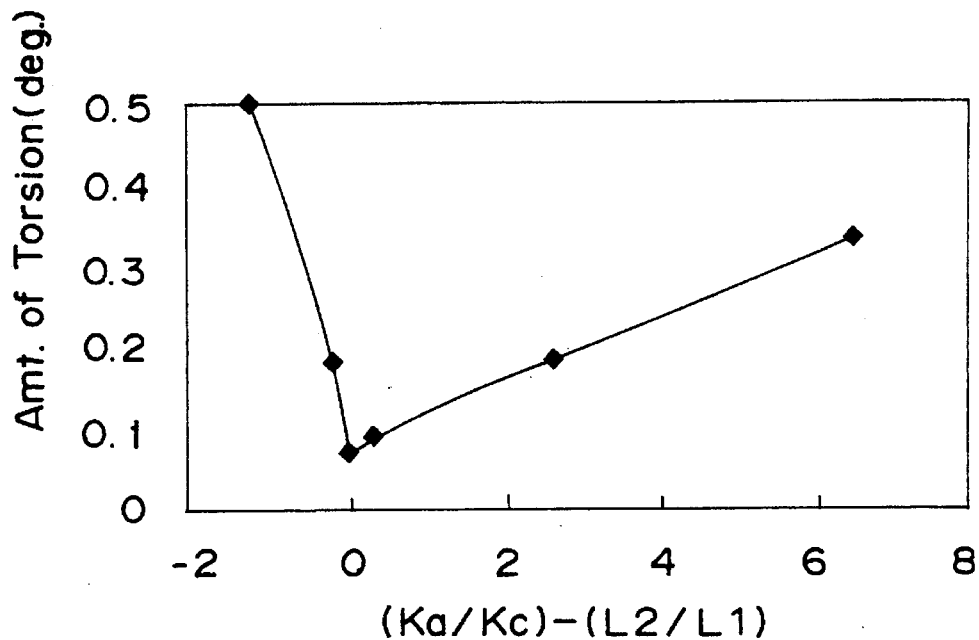
FIG. 4 is a graph showing a change in amount of torsion occurring during a tracking drive with change in spring constant of upper and lower pairs of elastic support members used to carry the lens holder.

FIG. 4 illustrates a graph in which measurements of the amount of torsion of the movable unit MU about the axis Y which occurred when the spring constant of the wire spring 5a (and 5b) of the upper pair and that of the wire spring 6c (and 6d) of the lower pair were individually changed are plotted. The measurement was carried out under the condition in which the movable unit MU, 1.6 gram in weight and having the total spring constant of 56.85 Newton/meter, was driven in the tracking direction X at an amplitude of 0.6 mm and at a primary resonance frequency of 30 Hz by the supply of an alternating current (30 Hz). When the support center S of the upper and lower pairs of the wire springs is in level with the center of gravity G of the movable unit MU, the amount of torsion of the movable unit MU about the axis Y becomes small.

$$\{(Ka/Kc)-(L2/L1)=0\}.$$

Figure 5:
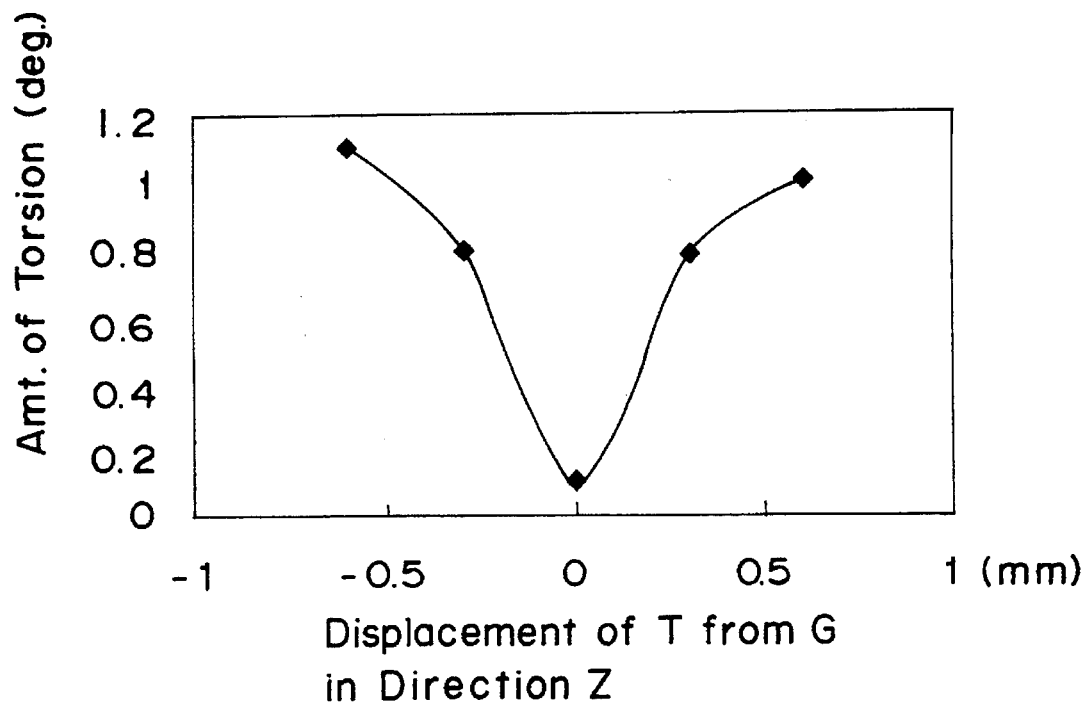
FIG. 5 is a graph showing a change in amount of torsion with change in position at which tracking coils are fitted with respect to a direction parallel to the optical axis.

FIG. 5 illustrates a graph in which measurements of the amount of torsion of the movable unit MU about the axis Y which occurred when the position of fitting of the tracking coils in a direction parallel to the focusing direction Z was changed. The measurement was carried out under the condition in which the movable unit MU, 1.6 gram in weight and having the total spring constant of 56.85 Newton/meter, was driven in the tracking direction X at an amplitude of 0.3 mm and at a primary resonance frequency of 50 Hz by the supply of an alternating current (50 Hz). When the tracking drive center T is brought into alignment with the center of gravity G of the movable unit MU, the amount of torsion of the movable unit MU about the axis Y becomes small at 50 Hz.

Figure 6:
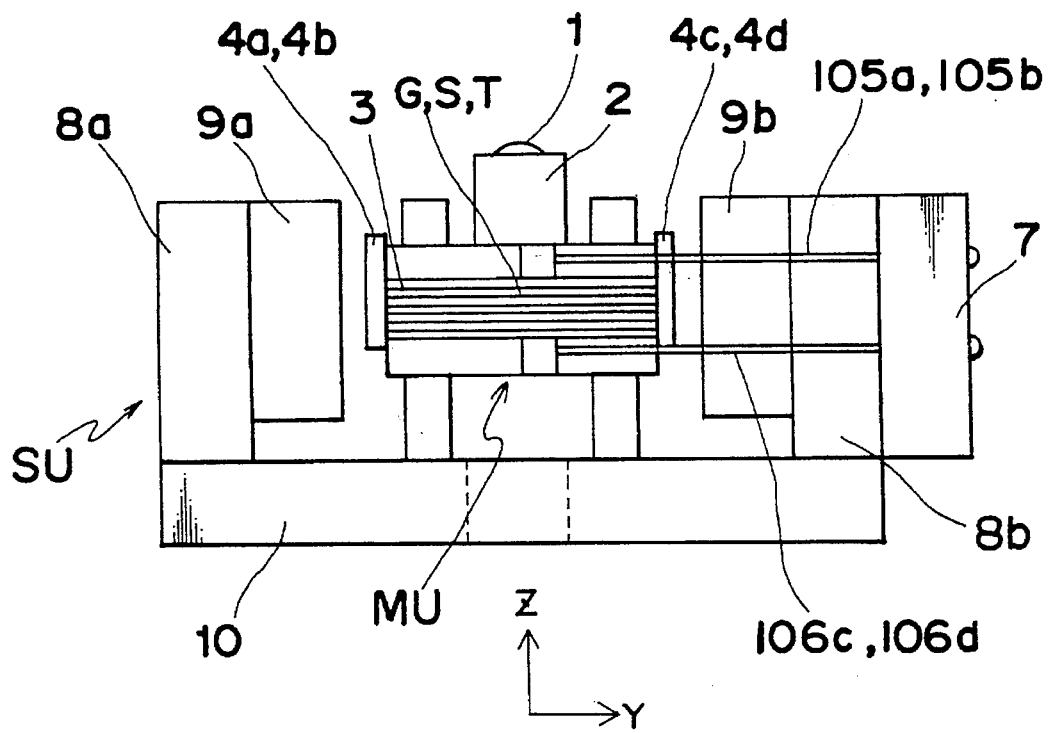
FIG. 6 is a view similar to FIG. 1, showing the lens drive mechanism according to a second preferred embodiment of the present invention.

FIG. 6 illustrates the lens drive mechanism according to a second preferred embodiment of the present invention. The lens drive mechanism shown therein differs from that shown in FIG. 1 in respect of the upper and lower pairs of the wire springs for the support of the lens holder 2. According to the second preferred embodiment of the present invention, the upper pair of the wire springs 105a and 105b and the lower pair of the wire springs 106c and 106d have an equal effective length, but a different diameter to adjust the spring constant so that the support center S is brought into alignment with the center of gravity G of the movable unit MU.

Even the lens drive mechanism shown in FIG. 6 functions in a manner substantially similar to that shown in FIG. 1 and, therefore, the details thereof will not be reiterated for the sake of brevity.

However, according to the second preferred embodiment of the present invention, since each of the wire springs 105a and 105b of the upper pair has an effective length equal to, but a diameter different from, that of each of the wire springs 106c and 106d of the lower pair so that the spring constants are adjusted to bring the support center S into alignment with the center of gravity G of the movable unit MU, the lens drive mechanism shown in FIG. 6 does not only bring about similar effects to those brought about by the lens drive mechanism of FIG. 1, but also an additional effect that the objective lens 1 can be driven in the focusing direction without being tilted.

Although in the second preferred embodiment of the present invention, the diameters of the respective wire springs of each pair have been adjusted to bring the support center S into alignment with the center of gravity G of the movable unit MU, the objective can be accomplished even if, while the wire springs of the upper pair and those of the lower pair have an equal diameter, they are made of different material. In addition, the objective can be equally accomplished even if in place of the wire springs any suitable elongated plates having a spring property are employed with the spring plates of the upper pair being different in thickness and width from those of the lower pair.

A third preferred embodiment of the present invention will now be described with particular reference to FIG. 7. In this embodiment, a pair of the tracking coils 104a and 104b adjacent the upright yoke 8a carrying the permanent magnet 109a are cemented to that portion of the focusing coil 3 about an intermediate of the width of the focusing coil 3 as measured in a direction conforming to the focusing direction Z whereas a pair of the tracking coils 104c and 104d adjacent the upright yoke 8b carrying the permanent magnet 109b are cemented to that opposite portion of the focusing coil 3 at the intermediate of the width of the focusing coil 3.

Figure 7:
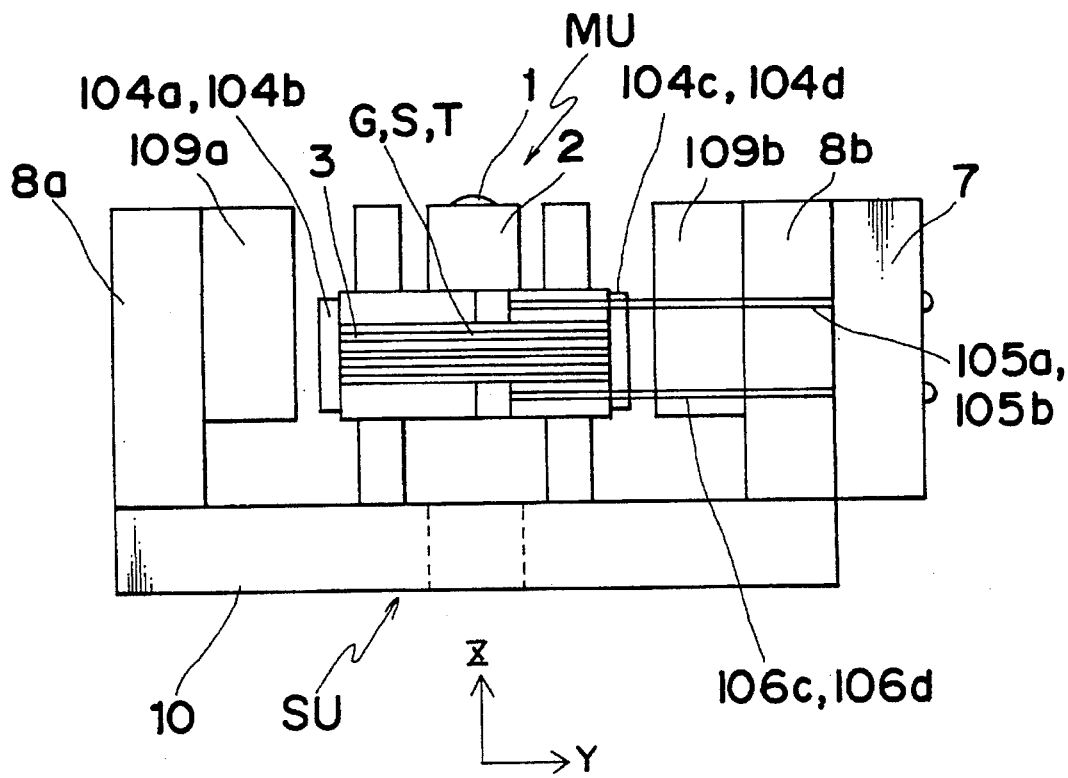
FIG. 7 is a view similar to FIG. 1, showing the lens drive mechanism according to a third preferred embodiment of the present invention.

In this embodiment of FIG. 7, considering that magnetic fluxes emanating in the magnetic circuits created by the permanent magnets 109a and 109b in cooperation with the adjacent upright yoke 8a and 8b are distributed in a gap in a pattern shown by the arrows in a manner substantially as shown in a left portion of FIG. 3 and that a center portion of the pattern of distribution of the gap magnetic fluxes represents a peak value, the pattern of distribution of the gap magnetic fluxes is utilized to allow the center of fitting of the permanent magnets 109a and 109b with respect to the focusing direction Z to be substantially aligned with the center of gravity G of the movable unit MU and also to allow the tracking drive center T of the tracking drive forces generated between the magnetic circuits and the pairs of the tracking coils 104a, 104b and 104c, 104d to be aligned with the center of gravity G of the movable unit MU.

Even the lens drive mechanism shown in FIG. 7 functions in a manner substantially similar to that shown in FIG. 1 and, therefore, the details thereof will not be reiterated for the sake of brevity.

However, according to the third preferred embodiment of the present invention, by making the center of fitting of the permanent magnets 109a and 109b with respect to the focusing direction Z align with the center of gravity G of the movable unit MU to thereby adjust the position of the magnetic circuits, created by the permanent magnets 109a and 109b in cooperation with the adjacent upright yokes 8a and 8b, with respect to the focusing direction Z, it is possible to bring the tracking drive center T, generated in the tracking coils 104a to 104d, into alignment with the center of gravity G of the movable unit MU. Accordingly, the respective pairs of the tracking coils 104a, 104b and 104c, 104d can be mounted to the opposite portions of the lens holder 2 at respective locations about the intermediate of the width of the focusing coil 3 without allowing the tracking coils 104a to 104d to protrude outwardly from the contour of the associated side faces of the lens holder 2. This in turn makes it possible to increase the rigidity of the movable unit MU sufficient to permit a stabilized servo characteristic to be exhibited, in addition to effects similar to those brought about by the first preferred embodiment of the present invention.

Figure 8:
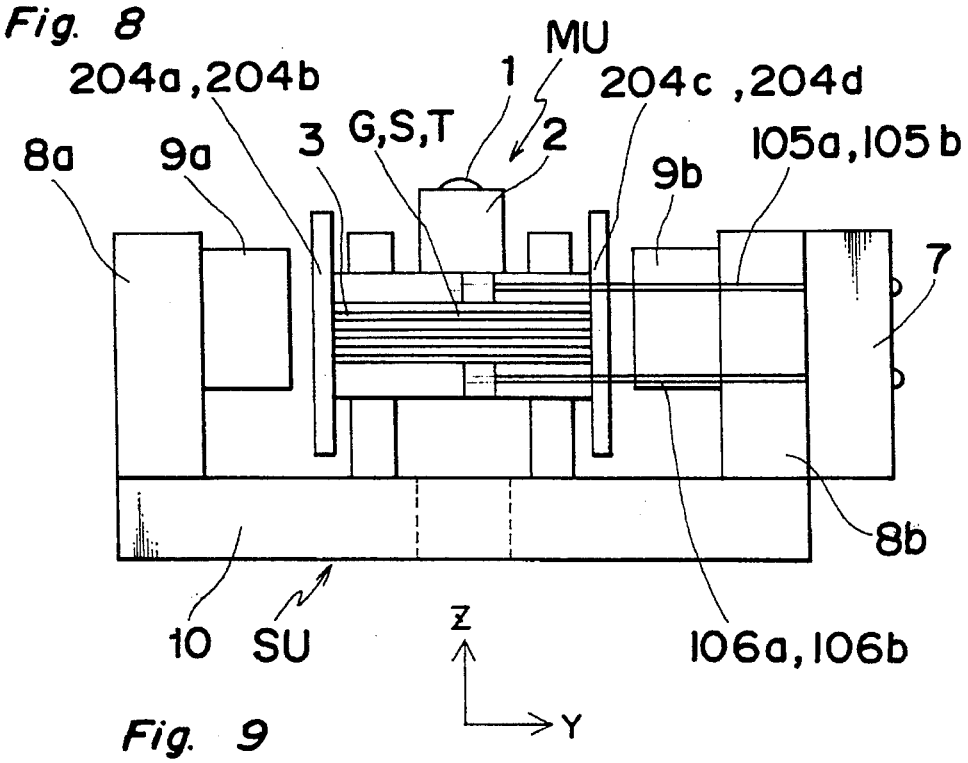
FIG. 8 is a view similar to FIG. 1, showing the lens drive mechanism according to a fourth preferred embodiment of the present invention.
Figure 9:
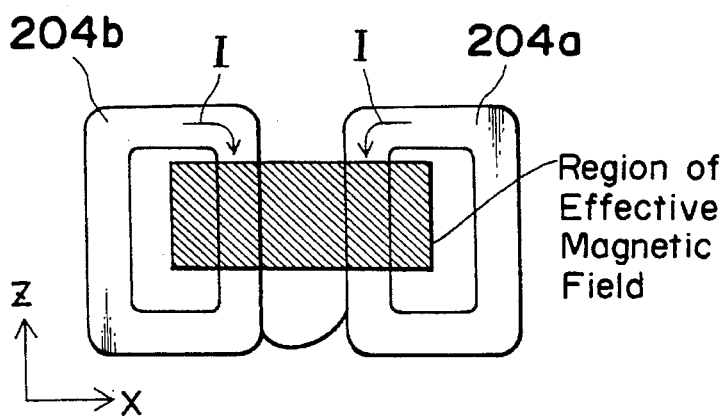
FIG. 9 is a side elevational view of one of pairs of tracking coils employed in the lens drive mechanism of FIG. 8.

With reference to FIGS. 8 and 9, the lens drive mechanism according to a fourth preferred embodiment of the present invention will now be described.

In this embodiment of FIGS. 8 and 9, each of the tracking coils 204a to 204d is employed in the form of a generally rectangular flat coil with the pair of the tracking coils 204a and 204b and the pair of the tracking coils 204c and 204d secured to those opposite portions of the lens holder 2 while confronting the respective permanent magnets 9a and 9b which are carried by the associated upright yokes 8a and 8b. Each pair of the tracking coils 204a and 204b, 204c and 204d are so positioned that the center of fitting of those tracking coils with respect to the direction conforming to the focusing direction Z aligns with the center of gravity of the movable unit MU while the peak of the pattern of distribution of the gap magnetic fluxes in the associated magnetic circuit aligns with the center of gravity G of the movable unit MU. By so doing, top and bottom horizontal portions of the tracking coils 204a and 204b, 204c and 204d of each pair are positioned outside a region of effective magnetic fields, shown in FIG. 9, of the magnetic circuits created by the U-shaped upright yokes 8a and 8b in cooperation with the permanent magnets 9a and 9b.

Even the lens drive mechanism shown in FIG. 8 functions in a manner substantially similar to that shown in FIG. 1 and, therefore, the details thereof will not be reiterated for the sake of brevity.

However, according to the fourth preferred embodiment of the present invention, since the pairs of the rectangular flat tracking coils 204a, 204b and 204c, 204d are so secured to those opposite portions of the lens holder 2 and so positioned that the top and bottom horizontal portions of the tracking coils 204a and 204b, 204c and 204d of each pair are positioned outside the region of effective magnetic fields, shown in FIG. 9, of the magnetic circuits created by the U-shaped upright yokes 8a and 8b in cooperation with the permanent magnets 9a and 9b, no thrust force is generated from the top and bottom horizontal portions of each tracking coil even if an electric current is supplied thereto so as to flow in a direction shown by I in FIG. 9, and, therefore, in addition to effects similar to those brought about by the lens drive mechanism of FIG. 1, the lens drive mechanism of FIG. 8 brings about an additional effect that any possible tilt and torsional resonance of the objective lens 1 can be eliminated.

Figure 10:
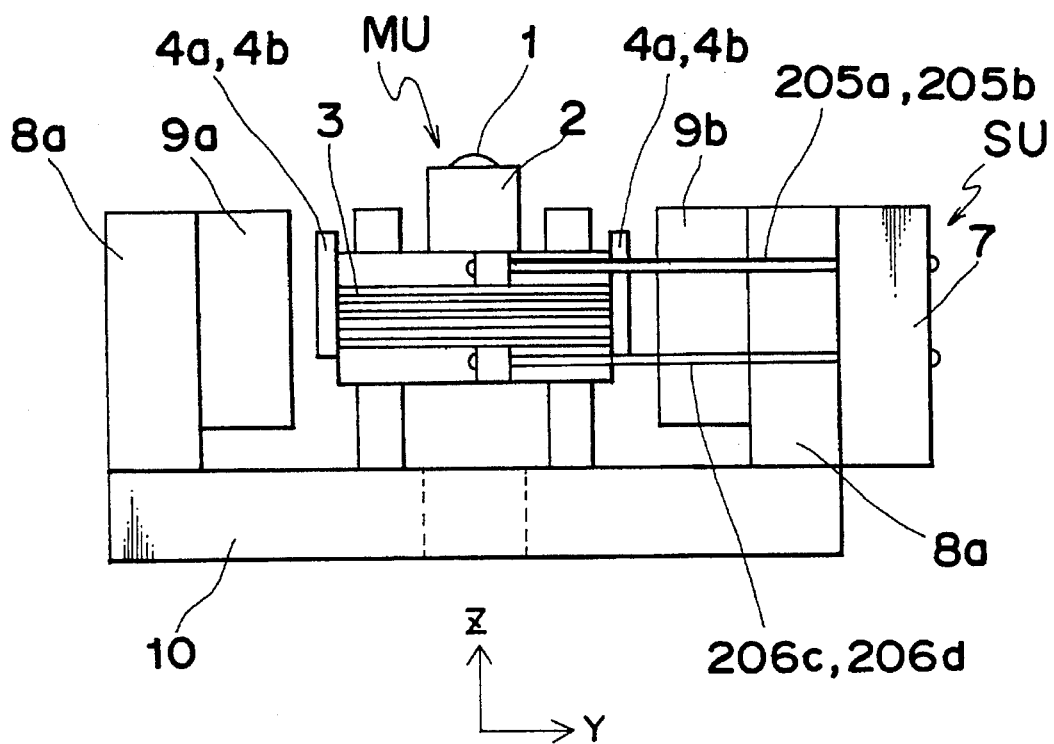
FIG. 10 is a view similar to FIG. 1, showing the lens drive mechanism according to a fifth preferred embodiment of the present invention.

In a fifth preferred embodiment of the present invention shown in FIG. 10, the wire springs 205a and 205b of the upper pair are colored in a color different from that of the wire springs 206c and 206d of the lower pair and the upper pair of the wire springs 205a and 205b and the lower pair of the wire springs 206c and 206d have an equal effective length, but a different diameter to adjust the spring constant so that the support center S is brought into alignment with the center of gravity G of the movable unit MU.

Coloring of the wire springs 205a and 205b of the upper pair can be accomplished by the use of either an electroplating process or a vapor-deposition process. Where the coloring is executed by the use of the vapor-deposition process, any possible variation in thickness of films deposited on the wire springs 205a and 205b is minimized enough to permit the spring constant of those wire springs to be stabilized.

According to the fifth preferred embodiment of the present invention, the colored wire springs and the non-colored wire springs are employed for the upper and lower pairs, respectively, in supporting the lens holder 2 and, therefore, there is no possibility that, during assemblage of the lens drive mechanism, the wire springs for the upper pair may be inadvertently used for the lower pair of the wire springs, and vice versa. Accordingly, in addition to effects similar to those brought about by the lens drive mechanism of the type shown in FIG. 1, the lens drive mechanism shown in FIG. 10 brings about an additional effect that not only is the quality stabilized, but the production yield increases enough to reduce the manufacturing cost.

It is to be noted that similar effects can be obtained even if, while all of the wire springs having a different length are employed, unnecessary portions of the wire springs are removed by cutting after completion of assemblage of the lens drive mechanism.

While in any one of the foregoing embodiments of the present invention, the lens drive mechanism has been of a moving coil type in which the focusing and tracking coils are included in the movable unit MU, the present invention can be equally applied to the moving magnet type in which, while the focusing and tracking coils are included in the stationary unit SU, the permanent magnets are included in the moving unit MU. An example of the lens drive mechanism of the moving magnet type is shown in FIG. 11 as a sixth preferred embodiment of the present invention.

Figure 11:
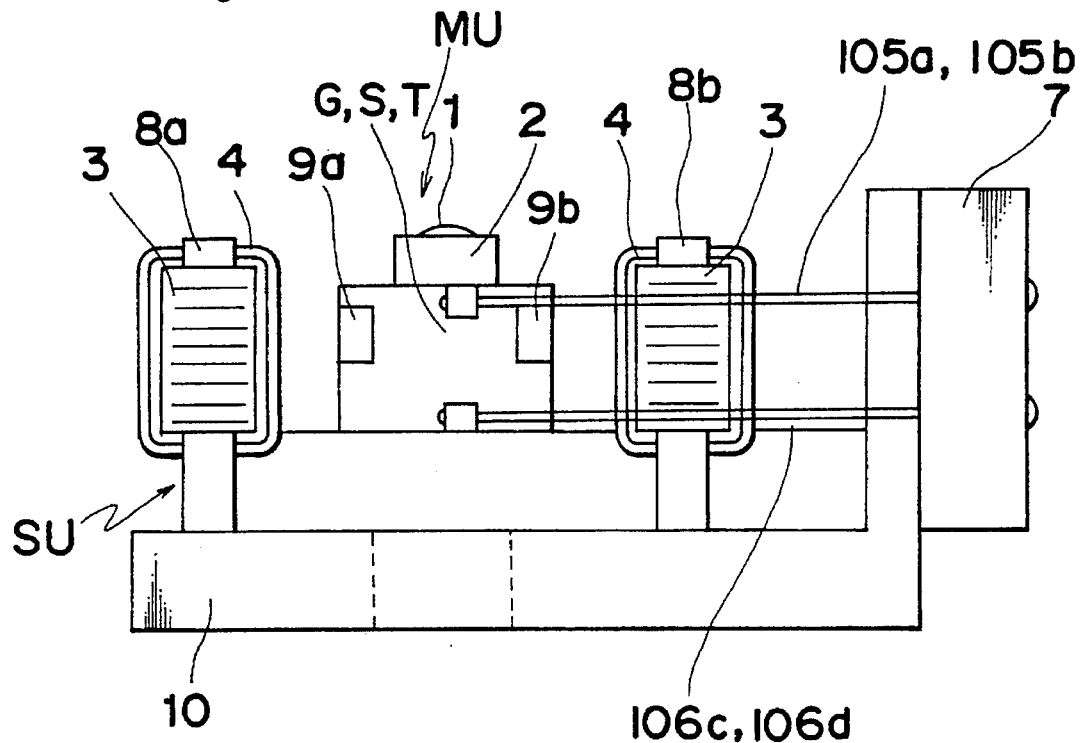
FIG. 11 is a schematic side view of the lens drive mechanism according to a sixth preferred embodiment of the present invention.

As shown in FIG. 11, the lens drive mechanism according to the sixth embodiment of the present invention differs from that according to the first preferred embodiment in that the permanent magnets 9a and 9b are secured to the opposite portions of the bobbin of the lens holder 2 so as to confront the adjacent upright yokes 8a and 8b while two focusing coils 3 are mounted on the respective upright yokes 8a and 8b with their turns oriented horizontally and tracking coils 4 are also mounted on the respective upright yokes 8a and 8b through the focusing coils 3 with their turns oriented vertically. In this embodiment, the center of fitting of the permanent magnets 9a and 9b is so chosen as to align with the center of gravity G of the movable unit MU including the lens holder 2 and the permanent magnets 9a and 9b.

Even the lens drive mechanism shown in FIG. 11 functions in a manner substantially similar to that shown in FIG. 1 and, therefore, the details thereof will not be reiterated for the sake of brevity.

However, according to the sixth preferred embodiment of the present invention, since the permanent magnets are secured to the lens holder and the coils are positioned remote from the objective lens, the lens drive mechanism of this embodiment brings about an additional effect of eliminating any possible deterioration of an optical characteristic of the objective lens which would occur as a result of heating of the coils, in addition to effects similar to those brought about by the lens drive mechanism of the first embodiment.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A lens drive mechanism which comprises:
    a movable unit including an objective lens for focusing a coherent beam of light on at least an information carrier medium, a lens holder carrying the objective lens, focusing and tracking coil elements secured to or wound around a periphery of the lens holder;
    a magnetic circuit including a permanent magnet element and a U-shaped yoke means and sandwiching the focusing and tracking coil elements; and
    a plurality of support members sandwiching the focusing coil element and connected at one end to a periphery of the lens holder and at the opposite end to a support fixture for supporting the movable unit for movement in focusing and tracking directions substantially perpendicular to each other, wherein a center of fitting of an upper set of the support members adjacent the objective lens and a lower set of the support members adjacent the yoke means with respect to a direction parallel to an optical axis of the objective lens is different from the center of gravity of the movable unit;
    an upper set of the support members having a spring constant different from that of a lower set of the support members, and the product of the spring constant of the upper set of the support members multiplied by a distance from the center of gravity of the movable unit to a position of securement of the upper set of the support members being chosen to be equal to the product of the spring constant of the lower set of the support members multiplied by a distance from the center of gravity of the movable unit to a position of securement of the lower set of the support members.

2. The lens drive mechanism as claimed in claim 1, wherein a center of fitting of the tracking coil element with respect to a direction parallel to the optical axis of the objective lens is moved to a position different from the position of securement of the support members with respect to the direction parallel to the optical axis to thereby bring a center of a tracking drive force generated in the tracking coil element into alignment with the center of gravity of the movable unit.

3. The lens drive mechanism as claimed in claim 1, wherein the upper set of the support members has an effective length different from that of the lower set of the support members for adjusting the spring constant.

4. The lens drive mechanism as claimed in claim 1, wherein each of the support members of any one of the upper and lower sets is in the form of a wire spring and wherein the upper set of the wire springs has a diameter different from that of the lower set of the wire spring for adjusting the spring constant.

5. The lens drive mechanism as claimed in claim 1, wherein each of the support members of any one of the upper and lower sets is in the form of a generally elongated spring plate having a spring property and wherein the upper set of the spring plates has a thickness or a width different from that of the lower set of the spring plates for adjusting the spring constant.

6. The lens drive mechanism as claimed in claim 1, wherein the upper set of the support members is made of material different from that of the lower set of the support members for adjusting the spring constant.

7. The lens drive mechanism as claimed in claim 1, wherein the upper set of the support members is colored in a color different from that of the lower set of the support members.

8. The lens drive mechanism as claimed in claim 1, wherein the upper and lower sets of the support members are colored in different colors by means of electroplating to make the upper and lower sets of the support members to have different spring constants, respectively.

9. The lens drive mechanism as claimed in claim 1, wherein the upper and lower sets of the support members are colored in different colors by means of vapor-deposition to make the upper and lower sets of the support members to have different spring constants, respectively.

10. The lens drive mechanism as claimed in claim 1, wherein the upper set of the support members has a length different from that of the lower set of the support members, and wherein an unnecessary portion of each of the support members of one of the upper and lower sets of support members that differ in length from the other of the upper and lower sets of the support members is removed by cutting after assemblage.

11. The lens drive mechanism as claimed in claim 1, wherein a center of securement of the upper and lower sets of the support members with respect to a direction parallel to the optical axis is aligned with a position of securement of the tracking coil with respect to the direction parallel to the optical axis, wherein a position of securement of the permanent magnet element in the magnetic circuit created by the magnet element and the U-shaped yoke means on respective sides of the tracking coil is adjusted with respect to the direction parallel to the optical axis, and wherein the center of gravity of the movable unit which provides a center of securement of the support members with respect to the direction parallel to the optical axis is substantially aligned with a center of a tracking drive force generated in the tracking coil.

12. The lens drive mechanism as claimed in claim 11, wherein each of the tracking coils secured to opposite side portions of the lens holder is in the form of a generally rectangular flat coil, said magnetic circuit being constituted by the permanent magnet element and the U-shaped yoke means on respective sides of the rectangular flat tracking coils, wherein horizontal portions of the rectangular flat tracking coils which are spaced in a direction parallel to the optical axis are positioned outside a region of an effective magnetic field of the magnetic circuit.

13. The lens drive mechanism as claimed in claim 2, wherein the upper set of the support members has an effective length different from that of the lower set of the support members for adjusting the spring constant.

14. The lens drive mechanism as claimed in claim 2, wherein each of the support members of any one of the upper and lower sets is in the form of a wire spring and wherein the upper set of the wire springs has a diameter different from that of the lower set of the wire spring for adjusting the spring constant.

15. The lens drive mechanism as claimed in claim 2, wherein each of the support members of any one of the upper and lower sets is in the form of a generally elongated spring plate having a spring property and wherein the upper set of the spring plates has a thickness or a width different from that of the lower set of the spring plates for adjusting the spring constant.

16. The lens drive mechanism as claimed in claim 2, wherein the upper set of the support members is made of material different from that of the lower set of the support members for adjusting the spring constant.

17. The lens drive mechanism as claimed in claim 2, wherein the upper set of the support members is colored in a color different from that of the lower set of the support members.

18. The lens drive mechanism as claimed in claim 2, wherein the upper and lower sets of the support members are colored in different colors by means of electroplating to make the upper and lower sets of the support members to have different spring constants, respectively.

19. The lens drive mechanism as claimed in claim 2, wherein the upper and lower sets of the support members are colored in different colors by means of vapor-deposition to make the upper and lower sets of the support members to have different spring constants, respectively.

20. The lens drive mechanism as claimed in claim 2, wherein the upper set of the support members has a length different from that of the lower set of the support members, and wherein an unnecessary portion of each of the support members of one of the upper and lower sets of support members that differ in length from the other of the upper and lower sets of the support members is removed by cutting after assemblage.

* * * * *